United States Patent
Chiffey et al.

(10) Patent No.: US 10,240,500 B2
(45) Date of Patent: *Mar. 26, 2019

(54) EXHAUST SYSTEM FOR A COMPRESSION IGNITION ENGINE HAVING A CAPTURE FACE FOR VOLATILISED PLATINUM

(71) Applicant: Johnson Matthey Public Limited Company, London (GB)

(72) Inventors: Andrew Francis Chiffey, Ware (GB); Francois Moreau, Cambridge (GB); Paul Richard Phillips, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/017,682

(22) Filed: Feb. 8, 2016

(65) Prior Publication Data
US 2016/0273427 A1    Sep. 22, 2016

(30) Foreign Application Priority Data
Mar. 19, 2015 (GB) .................................. 1504658.4

(51) Int. Cl.
*F01N 3/035* (2006.01)
*B01D 53/94* (2006.01)
(Continued)

(52) U.S. Cl.
CPC .......... *F01N 3/035* (2013.01); *B01D 53/944* (2013.01); *B01D 53/9418* (2013.01); *B01J 23/42* (2013.01); *B01J 23/44* (2013.01); *B01J 29/7415* (2013.01); *B01J 35/0006* (2013.01); *B01J 37/0246* (2013.01); *F01N 3/0222* (2013.01); *F01N 3/106* (2013.01); *F01N 3/2066* (2013.01); *F01N 13/009* (2014.06); *B01D 53/9477* (2013.01); *B01D 2251/2062* (2013.01); *B01D 2255/106* (2013.01); *B01D 2255/1021* (2013.01); *B01D 2255/1023* (2013.01); *B01D 2255/1025* (2013.01); *B01D 2255/2065* (2013.01); *B01D 2255/2092* (2013.01); *B01D 2255/20707* (2013.01); *B01D 2255/20761* (2013.01);
(Continued)

(58) Field of Classification Search
None
See application file for complete search history.

(56) References Cited

U.S. PATENT DOCUMENTS 7,998,242 B2    8/2011  Bergeal et al.
8,257,659 B2    9/2012  Simon, III et al.
(Continued)

FOREIGN PATENT DOCUMENTS

EP    2674584 A1    12/2013
EP    2703077 A1    3/2014
(Continued)

*Primary Examiner* — Walter D. Griffin
*Assistant Examiner* — Jelitza M Perez
(74) *Attorney, Agent, or Firm* — Gary D. Mangels

(57) ABSTRACT

An oxidation catalyst for treating an exhaust gas produced by a compression ignition engine comprising: a substrate having an inlet end surface and an outlet end surface; a catalytic material disposed on the substrate, wherein the catalytic material comprises platinum (Pt); and a capture material, wherein the capture material is disposed on the outlet end surface.

15 Claims, 2 Drawing Sheets

(51) Int. Cl.

| | |
|---|---|
| *B01J 35/00* | (2006.01) |
| *B01J 23/42* | (2006.01) |
| *B01J 23/44* | (2006.01) |
| *F01N 3/10* | (2006.01) |
| *F01N 3/20* | (2006.01) |
| *F01N 13/00* | (2010.01) |
| *B01J 29/74* | (2006.01) |
| *F01N 3/022* | (2006.01) |
| *B01J 37/02* | (2006.01) |
| *B01J 23/52* | (2006.01) |
| *B01J 35/04* | (2006.01) |
| *B01J 23/89* | (2006.01) |
| *B01J 29/76* | (2006.01) |

(52) U.S. Cl.
CPC .... *B01D 2255/30* (2013.01); *B01D 2255/502* (2013.01); *B01D 2255/9032* (2013.01); *B01D 2255/91* (2013.01); *B01D 2258/012* (2013.01); *B01J 23/52* (2013.01); *B01J 23/8926* (2013.01); *B01J 29/763* (2013.01); *B01J 35/04* (2013.01); *B01J 37/0234* (2013.01); *F01N 2510/0682* (2013.01); *F01N 2570/00* (2013.01); *Y02A 50/2325* (2018.01); *Y02T 10/24* (2013.01)

(56) References Cited

U.S. PATENT DOCUMENTS

| | | | |
|---|---|---|---|
| 8,652,429 B2 | 2/2014 | Sumiya et al. | |
| 8,667,785 B2 | 3/2014 | Blakeman et al. | |
| 8,668,891 B2 | 3/2014 | Blakeman et al. | |
| 8,703,236 B2 | 4/2014 | Chandler et al. | |
| 9,259,684 B2 | 2/2016 | Blakeman et al. | |
| 9,492,787 B2 | 11/2016 | Schuetze et al. | |
| 2004/0001781 A1 | 1/2004 | Kumar et al. | |
| 2011/0138777 A1 | 6/2011 | Jen et al. | |
| 2012/0308439 A1 | 12/2012 | Chen et al. | |
| 2013/0149207 A1 | 6/2013 | Castagnola et al. | |
| 2013/0149221 A1* | 6/2013 | Blakeman | B01J 35/0006 423/213.5 |
| 2015/0290630 A1* | 10/2015 | Nazarpoor | B01J 23/8986 502/324 |

FOREIGN PATENT DOCUMENTS

| | | |
|---|---|---|
| GB | 1474589 | 5/1977 |
| GB | 2122912 A | 1/1984 |
| GB | 2142253 A | 1/1985 |
| GB | 2518502 A | 7/2013 |
| WO | 1999047260 A1 | 9/1999 |
| WO | 2007077462 A1 | 7/2007 |
| WO | 2011080525 A1 | 7/2011 |
| WO | 2012166868 A1 | 12/2012 |
| WO | 2013050784 | 4/2013 |
| WO | 2013088128 | 6/2013 |
| WO | 2013088132 A1 | 6/2013 |
| WO | 2013088133 A1 | 6/2013 |
| WO | 2015085300 A1 | 6/2015 |
| WO | 2015095056 | 6/2015 |

* cited by examiner

EXHAUST SYSTEM FOR A COMPRESSION IGNITION ENGINE HAVING A CAPTURE FACE FOR VOLATILISED PLATINUM

FIELD OF THE INVENTION

The invention relates to an oxidation catalyst and an exhaust system for treating an exhaust gas produced by a compression ignition engine. The invention further relates to methods and uses of the oxidation catalyst. The invention also relates to a vehicle comprising the oxidation catalyst or the exhaust system.

BACKGROUND TO THE INVENTION

Compression ignition engines produce an exhaust gas that contains a variety of pollutants that are the subject of environmental legislation around the world. These pollutants include carbon monoxide (CO), unburned hydrocarbons (HCs), oxides of nitrogen ($NO_x$) and particulate matter (PM).

To meet permissible levels of pollutants that may be emitted into the atmosphere set by legislation, exhaust systems for treating the exhaust gas produced by a compression ignition generally contain several emissions control devices. In such exhaust systems, the exhaust gas is usually conducted to a first emissions control device that is able to oxidise carbon monoxide (CO) and the unburned hydrocarbons (HCs) that are present in the gas. The first emissions control device may, for example, be a diesel oxidation catalyst (DOC), a catalysed soot filter (CSF), a NO storage catalyst (NSC), a passive NO adsorber (PNA), a diesel exotherm catalyst (DEC), or a cold start concept (CSC™) catalyst.

For $NO_x$ emissions, exhaust systems for compression ignition engines may contain a catalyst for the selective catalytic reduction of $NO_x$, such as selective catalytic reduction (SCR) catalyst or selective catalytic reduction filter (SCRF™) catalyst. The selective catalytic reduction (SCR) of $NO_x$ primarily occurs by the following three reactions:

$$4NH_3 + 4NO + O_2 \rightarrow 4N_2 + 6H_2O; \qquad (1)$$

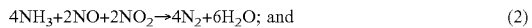

$$4NH_3 + 2NO + 2NO_2 \rightarrow 4N_2 + 6H_2O; \text{ and} \qquad (2)$$

$$8NH_3 + 6NO \rightarrow 7N_2 + 12H_2O. \qquad (3)$$

The ratio of $NO_2:NO$ in the exhaust gas that enters an SCR catalyst or SCRF™ catalyst can affect its performance. In general, SCR catalysts or SCRF™ catalysts show optimum performance when the ratio of $NO_2:NO$ is about 1:1. This can be problematic because the exhaust gas produced by a compression ignition engine during normal use typically contains insufficient $NO_2$ (i.e. the ratio of $NO_2:NO$ is much lower than 1:1) for optimal performance of the SCR catalyst or the SCRF™ catalyst. To compensate for such low levels of $NO_2$, the first emissions control device often contains a catalytic material that has been formulated to oxidise nitrogen monoxide (NO) to nitrogen dioxide ($NO_2$), thereby increasing the ratio of $NO_2:NO$ in the exhaust gas. The SCR catalyst or SCRF™ catalyst is usually arranged downstream of the first emissions control device in an exhaust system, so that the exhaust gas will pass through the first emissions control device before passing through the SCR catalyst or SCRF™ catalyst.

The catalytic material for oxidising NO to $NO_2$ typically comprises platinum (Pt). When the first emissions control device is exposed to relatively high temperatures for a sufficient period of time, low levels of platinum (Pt) may volatilise from the catalytic material and can become trapped on the SCR/SCRF™ catalyst. Such relatively high temperatures may occur during normal use, especially in heavy duty diesel applications, or during filter regeneration, such as when the first emissions control device is a CSF or when there is an upstream diesel particulate filter (DPF). Pt trapped on the SCR catalyst or the SCRF™ catalyst can have a highly detrimental effect on the catalyst's performance because it can oxidise ammonia ($NH_3$). The trapped Pt can consume the $NH_3$ that is intended for the selective catalytic reduction of $NO_x$ (thereby decreasing $NO_x$ conversion) and undesirable, secondary emissions may be produced.

The problem of Pt volatilisation is discussed in our publications WO 2013/088133, WO 2013/088132, WO 2013/088128 and WO 2013/050784.

SUMMARY OF THE INVENTION

The inventors have surprisingly found a way of reducing or preventing volatilised platinum from escaping a platinum-containing oxidation catalyst which can also avoid decreasing the amount of $NO_2$ that has been generated by the catalyst. The invention provides a cost effective solution to these problems because it does not require the use of large quantities of expensive materials, such as noble metals or rare earth metals.

The invention provides an oxidation catalyst for treating an exhaust gas produced by a compression ignition engine comprising: a substrate having an inlet end surface and an outlet end surface; a catalytic material disposed on the substrate, wherein the catalytic material comprises platinum (Pt); and a capture material, wherein the capture material is disposed or supported on the outlet end surface (i.e. of the substrate).

After exhaust gas has been contacted with and/or passed through the catalytic material, the exhaust gas may contain volatilised Pt, especially when the exhaust gas is relatively hot, such as when the engine has been operated under a heavy load for a prolonged period of time or when the engine is a heavy duty engine. The capture material is disposed or supported on the outlet end surface of the substrate. The capture material is arranged to contact the exhaust gas after the exhaust gas has contacted and/or passed through the catalytic material.

Oxidation catalysts in the art that have been found to be effective at capturing volatilised Pt have a capture material in an arrangement that can lower the amount of $NO_2$ (and also the ratio of $NO_2:NO$), particularly in the temperature region of the downstream emissions control device that is sensitive to the ratio of $NO_2:NO$, resulting in a potential reduction in the performance of the downstream device, especially when it is a SCR catalyst or a SCRF™ catalyst. The locating and the chemical properties of existing capture materials may negate the benefit of any Pt that is included in the catalytic material of an emissions control device for the generation of $NO_2$.

The inventors have developed an oxidation catalyst containing a capture material for trapping volatilised Pt that does not affect (i.e. decrease) the amount of $NO_2$ (e.g. the ratio of $NO_2:NO$) in an exhaust gas. The capture material is arranged to avoid reducing the amount of any $NO_2$ produced from the oxidation of NO by Pt in the catalytic material of the oxidation catalyst. Exhaust gas that has passed though both the catalytic material of the oxidation catalyst and the capture material will consequently contain a higher ratio of $NO_2:NO$ compared to the exhaust gas that was initially produced by the compression ignition engine, so that optimal performance of a downstream SCR/SCRF™ catalyst can be obtained.

The invention further provides an exhaust system for treating an exhaust gas produced by a compression ignition engine. The exhaust system comprises an oxidation catalyst of the invention.

The invention further provides a vehicle. The vehicle comprises a compression ignition engine and either an oxidation catalyst or an exhaust system of the invention.

Another aspect of the invention relates to the use of a capture material for capturing volatilised platinum (Pt) in an exhaust system, such as an exhaust system for treating an exhaust gas produced by a compression ignition engine. The exhaust system comprises an oxidation catalyst for treating the exhaust gas, the oxidation catalyst comprising: a substrate having an inlet end surface and an outlet end surface; a catalytic material disposed on the substrate, wherein the catalytic material comprises platinum (Pt); and the capture material, wherein the capture material is disposed or supported on the outlet end surface.

A further aspect of the invention relates to a method of capturing volatilised platinum (Pt) from a catalytic material in an exhaust system for a compression ignition engine.

The invention also relates to a method of treating an exhaust gas produced by a compression ignition engine.

Each of the above methods of the invention comprises the step of passing an exhaust gas produced by a compression ignition engine through an exhaust system comprising an oxidation catalyst of the invention.

Generally, volatilised platinum may be present in an exhaust gas (i.e. in an exhaust system) when the temperature of the exhaust gas is ≥700° C., such as ≥800° C., preferably ≥900° C.

DETAILED DESCRIPTION OF THE INVENTION

Figure 1:
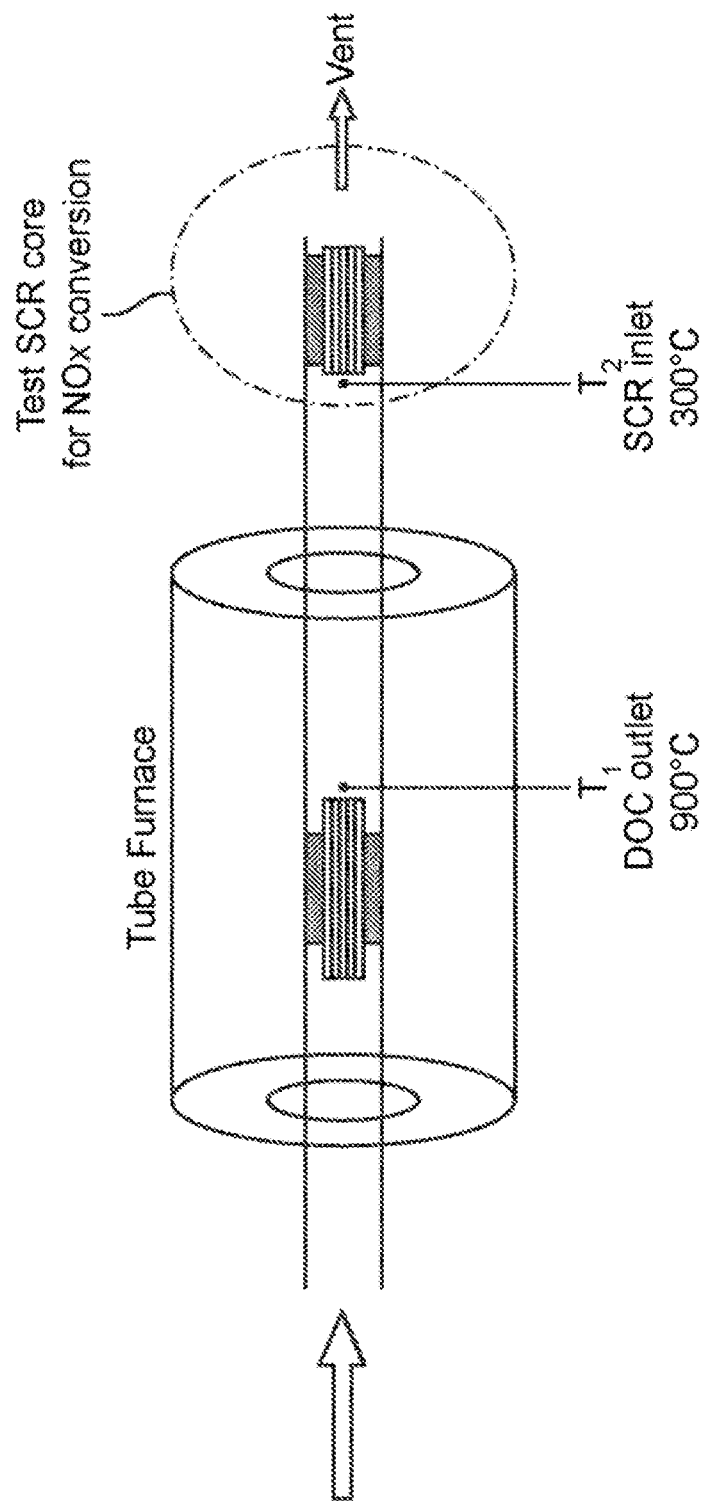
FIG. 1 is a schematic drawing of a laboratory reactor used for testing platinum contamination on a Cu/CHA zeolite SCR catalyst.
Figure 2:
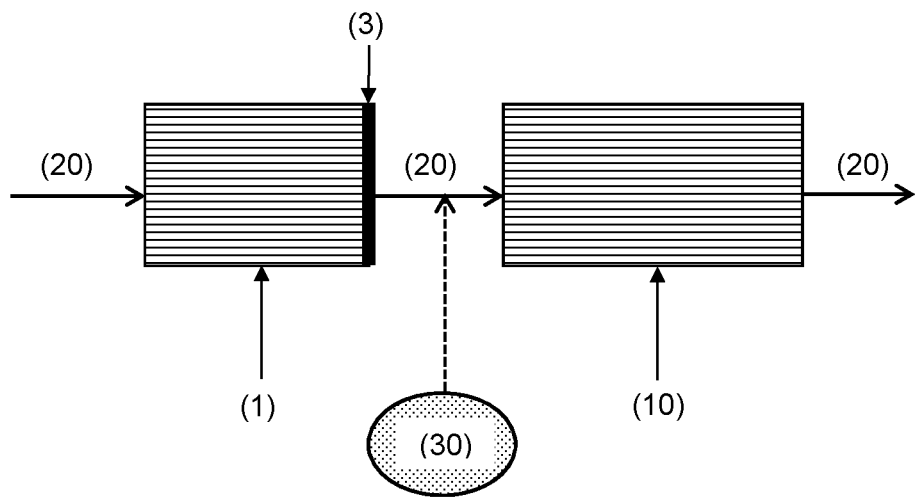
FIG. 2 is a schematic drawing showing an exhaust system embodiment of the invention. Exhaust gas (20) passes through an oxidation catalyst (1) of the invention, which has a capture material (3) disposed at an outlet end surface of the substrate. After exhaust gas (20) has passed through the oxidation catalyst (1), it passes through a second emissions control device (10), such as a selective catalytic reduction (SCR) catalyst or a selective catalytic reduction filter (SCRF™) catalyst. If SCR is to be performed actively, then a source of ammonia (30) may be introduced into the exhaust gas. For passive SCR, the source of ammonia (30) may not be present.
Figure 3:
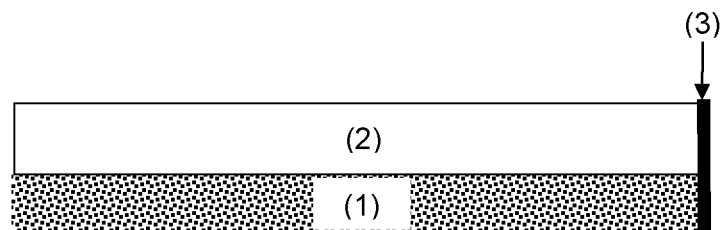
FIG. 3 is a schematic drawing of an oxidation catalyst of the invention. The oxidation catalyst has a catalytic material (2) disposed on a substrate (1). There is a capture material (3) disposed or supported at an outlet end surface of the substrate.
Figure 4:
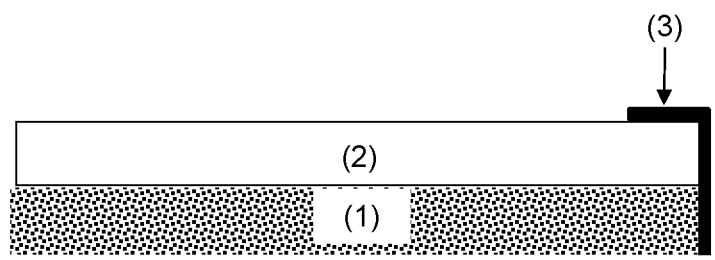
FIG. 4 is a schematic drawing of an oxidation catalyst of the invention. The oxidation catalyst has a catalytic material (2) disposed on a substrate (1). There is a capture material (3) disposed or supported at an outlet end surface of the substrate, which partially overlies the catalytic material (2).

The invention relates to a capture material for capturing volatilised platinum (Pt), which is disposed or supported on an outlet end surface of a substrate. The capture material is arranged to prevent the volatilised Pt from condensing on a second, downstream emissions control device, such as a SCR catalyst or SCRF™ catalyst.

The capture material comprises or consists essentially of:
(a) a Pt-alloying metal; and/or
(b) a refractory oxide.

The inventors have found that the use of a capture material in accordance with the invention can reduce or prevent volatilised Pt from becoming deposited on a downstream emissions control device, particularly a SCR catalyst or SCRF™ catalyst, when the capture material is disposed or supported on an outlet end face of the substrate of a Pt-containing oxidation catalyst. The arrangement of the capture material ensures that it has low catalytic activity, particularly toward the oxidation of CO and/or unburned HCs, and especially toward the oxidation of $NO_x$. In general, the capture material is also substantially catalytically inactive toward the degradation or reduction of $NO_2$, particularly under the conditions at which Pt volatilisation occurs and/or in the temperature region at which a downstream SCR catalyst or SCRF™ catalyst is sensitive to the ratio of $NO_2$:NO.

The capture material may be directly disposed or supported onto the outlet end surface of the substrate (e.g. the capture material is in contact with the outlet end surface of the substrate).

Generally, it is preferable that the capture material (i.e. when new or unused) is substantially free of platinum or the capture material does not comprise platinum.

The inclusion of a Pt-alloying material (PAM) in the capture material has been found to be advantageous because it can readily form an alloy with volatilised Pt. The formation of an alloy between Pt and the Pt-alloying material (e.g. Pt—Pd alloy) in the capture material effectively traps the volatilised Pt because of the stability of the alloy.

The Pt-alloying material is preferably a particulate Pt-alloying material (i.e. particles of a Pt-alloying material).

Typically, the Pt-alloying material comprises, or consists essentially of, a metal and/or an oxide thereof. The metal is preferably selected from the group consisting of palladium (Pd); gold (Au); copper (Cu); a mixture of Pd and Au; a mixture of Pd and Cu; a mixture of Au and Cu; a mixture of Pd, Au and Cu; a bimetallic alloy of Pd and Au; a bimetallic alloy of Pd and Cu; a bimetallic alloy of Au and Cu; and a trimetallic alloy of Pd, Au and Cu. It is preferred that the metal is selected from the group consisting of palladium (Pd), a mixture of Pd and Au, and a bimetallic alloy of Pd and Au. More preferably, the metal is palladium (Pd).

For the avoidance of doubt, the Pt-alloying material does not comprise platinum (e.g. when new or unused).

When the capture material comprises, or consists essentially of, a Pt-alloying material, then preferably the oxidation catalyst has a total loading of Pt-alloying material (e.g. the metal content of the Pt-alloying material) of 1 g ft$^{-3}$ to 500 g ft$^{-3}$ (e.g. 50 to 400 g ft$^{-3}$), preferably 4 g ft$^{-3}$ to 250 g ft$^{-3}$ (e.g. 75 to 250 g ft$^{-3}$), even more preferably 8 g ft$^{-3}$ to 150 g ft$^{-3}$ (e.g. 100 to 150 g ft$^{-3}$). The capture material can occupy a relatively small volume of the substrate and it may be necessary for a high loading of the Pt-alloying material to be present.

The Pt-alloying material, such as palladium, may be disposed or supported on an outlet end surface of the substrate (e.g. the Pt-alloying material is directly coated onto the outlet end surface of the substrate).

The capture material may comprise, or consist essentially of, a refractory oxide. The refractory oxide is preferably a particulate refractory oxide (i.e. particles of a refractory oxide).

The refractory oxide may be selected from the group consisting of alumina, silica, titania, zirconia, ceria and a mixed or composite oxide thereof, such as a mixed or composite oxide of two or more thereof. For example, the refractory oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

The refractory oxide may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof. The inclusion of a dopant can thermally stabilise the refractory oxide. It is to be understood that any reference to "doped" in this context refers to a material where the bulk or host lattice of the refractory oxide is substitution doped or interstitially doped with a dopant. In some instances, small amounts of the dopant may be present at a surface of the refractory oxide. However, most of the dopant will generally be present in the body of the refractory oxide.

When the refractory oxide is doped, the total amount of dopant is 0.25 to 5% by weight, preferably 0.5 to 3% by weight (e.g. about 1% by weight) of the refractory oxide.

When the refractory oxide comprises, or consists essentially of, ceria-zirconia, then the ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

It is preferred that the refractory oxide is selected from the group consisting of alumina, silica, ceria, silica-alumina, ceria-alumina, ceria-zirconia and alumina-magnesium oxide. More preferably, the refractory oxide is selected from the group consisting of alumina, ceria, silica-alumina and ceria-zirconia. The refractory oxide may be alumina or silica-alumina.

When the capture material comprises, or consists essentially of, a refractory oxide, then typically the oxidation catalyst has a total loading of the capture material of 0.1 to 3.5 g in$^{-3}$, preferably 0.2 to 2.5 g in$^{-3}$, still more preferably 0.3 to 2.0 g in$^{-3}$, and even more preferably 0.5 to 1.75 g in$^{-3}$ (e.g. 0.75 to 1.5 g in$^{-3}$).

In one embodiment, the capture material does not comprise a Pt-alloying material (PAM), particularly when the Pt-alloying material comprises palladium. This embodiment is referred to herein as the "PAM free embodiment". More preferably, the capture material does not comprise palladium and platinum. It is further preferred that the capture material does not comprise one or more platinum group metals (PGM) and/or one or more coinage metals gold (Au) and/or silver (Ag). Even more preferably, the capture material does not comprise one or more transition metals (i.e. except for any transition metals that may be part of the refractory oxide, such as zirconia). In such circumstances, the refractory oxide may be used primarily or solely as the capture material.

In the PAM free embodiment, the refractory oxide is preferably ceria, ceria-alumina or ceria-zirconia. More preferably the refractory oxide comprises, or consists essentially, of ceria. Even more preferably, the refractory oxide consists essentially of ceria.

Generally, it is preferred that the capture material comprises, or consists essentially of, (a) a Pt-alloying metal; and (b) a refractory oxide.

It is preferred that the Pt-alloying material is disposed or supported on a support material (e.g. a particulate support material). The Pt-alloying material may be disposed directly onto or is directly supported by the support material (e.g. there is no intervening support material between the Pt-alloying material and the support material). For example, the Pt-alloying material, such as palladium, can be dispersed on a surface of and/or impregnated into the support material.

Generally, the support material comprises, or consists essentially of, the refractory oxide, such as the refractory oxide described above. Typically, the refractory oxide is not a material that promotes the catalytic activity of the Pt-alloying material, particularly when the Pt-alloying material comprises palladium (e.g. the catalytic activity of the palladium in the oxidation of CO and/or unburned HCs).

At least one particle of the Pt-alloying material may be disposed or supported on at least one particle of the refractory oxide. Preferably, a plurality of particles of Pt-alloying material are disposed or supported on at least one particle of the refractory oxide. More preferably, there is a plurality of particles of the refractory oxide, wherein a plurality of particles of Pt-alloying material are disposed or supported on each particle of the refractory oxide.

The refractory oxide may be as defined above. Thus, the refractory oxide may be selected from the group consisting of alumina, silica, titania, zirconia, ceria and a mixed or composite oxide thereof, such as a mixed or composite oxide of two or more thereof. For example, the refractory oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

The refractory oxide may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof.

When the refractory oxide is doped, the total amount of dopant is 0.25 to 5% by weight, preferably 0.5 to 3% by weight (e.g. about 1% by weight) of the refractory oxide.

When the refractory oxide comprises, or consists essentially of, ceria-zirconia, then the ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

It is preferred that the refractory oxide is selected from the group consisting of alumina, silica, ceria, silica-alumina, ceria-alumina, ceria-zirconia and alumina-magnesium oxide. More preferably, the refractory oxide is selected from the group consisting of alumina, ceria, silica-alumina and ceria-zirconia. Even more preferably, the refractory oxide is alumina or silica-alumina, particularly silica-alumina.

The capture material does not, in general, comprise a base metal, such as barium or vanadium.

The oxidation catalyst may be a diesel oxidation catalyst (DOC), a catalysed soot filter (CSF), a $NO_x$ storage catalyst (NSC), a passive $NO_x$ adsorber (PNA), a diesel exotherm catalyst (DEC), a cold start concept (CSC™) catalyst [see WO 2012/166868 and International patent application no. PCT/US14/69079, which are each incorporated herein by reference] or an ammonia slip catalyst (ASC). It is preferred that the oxidation catalyst is a DOC, a CSF, a NSC, a PNA or a DEC. More preferably, the oxidation catalyst is a DOC or a CSF.

For the avoidance of doubt, the capture material and the catalytic material have different compositions.

Generally, the catalytic material comprises platinum (Pt) disposed or supported on a support material (referred to herein as the support material of the catalytic material or "CM support material"). The platinum may be disposed directly onto or is directly supported by the support material (e.g. there is no intervening support material between the platinum and the support material). For example, platinum can be dispersed over a surface of and/or impregnated within the support material.

The CM support material comprises, or consists essentially of, a refractory oxide (referred to herein as the refractory oxide of the catalytic material). The refractory oxide is typically a particulate refractory oxide.

The refractory oxide of the CM support material is typically selected from the group consisting of alumina, silica, titania, zirconia, ceria and a mixed or composite oxide thereof, such as a mixed or composite oxide of two or more thereof. For example, the refractory oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

When the CM support material or the refractory oxide thereof, comprises or consists essentially of a mixed or composite oxide of alumina (e.g. silica-alumina, alumina-magnesium oxide or a mixture of alumina and ceria), then preferably the mixed or composite oxide of alumina comprises at least 50 to 99% by weight of alumina, more preferably 70 to 95% by weight of alumina, even more preferably 75 to 90% by weight of alumina.

When the CM support material or the refractory oxide thereof, comprises or consists essentially of ceria-zirconia, then the ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

The CM support material or the refractory oxide thereof may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof.

When the CM support material or the refractory oxide thereof is doped, the total amount of dopant is 0.25 to 5% by weight, preferably 0.5 to 3% by weight (e.g. about 1% by weight).

The CM support material or the refractory oxide thereof may comprise or consist essentially of alumina doped with a dopant. It is particularly preferred that the CM support material or the refractory oxide thereof comprises, or consists essentially of, alumina doped with a dopant when the catalytic material comprises an alkaline earth metal, preferably when the oxidation catalyst is a diesel oxidation catalyst (DOC) or a catalysed soot filter (CSF).

The alumina may be doped with a dopant comprising silicon (Si), magnesium (Mg), barium (Ba), lanthanum (La), cerium (Ce), titanium (Ti), or zirconium (Zr) or a combination of two or more thereof. The dopant may comprise, or consist essentially of, an oxide of silicon, an oxide of magnesium, an oxide of barium, an oxide of lanthanum, an oxide of cerium, an oxide of titanium or an oxide of zirconium. Preferably, the dopant comprises, or consists essentially of, silicon, magnesium, barium, cerium, or an oxide thereof, particularly silicon, or cerium, or an oxide thereof. More preferably, the dopant comprises, or consists essentially of, silicon, magnesium, barium, or an oxide thereof; particularly silicon, magnesium, or an oxide thereof; especially silicon or an oxide thereof.

Examples of alumina doped with a dopant include alumina doped with silica, alumina doped with magnesium oxide, alumina doped with barium or barium oxide, alumina doped with lanthanum oxide, or alumina doped with ceria, particularly alumina doped with silica, alumina doped with lanthanum oxide, or alumina doped with ceria. It is preferred that the alumina doped with a dopant is alumina doped with silica, alumina doped with barium or barium oxide, or alumina doped with magnesium oxide. More preferably, the alumina doped with a dopant is alumina doped with silica or alumina doped with magnesium oxide. Even more preferably, the alumina doped with a dopant is alumina doped with silica.

When the alumina is alumina doped with silica, then the alumina is doped with silica in a total amount of 0.5 to 45% by weight (i.e. % by weight of the alumina), preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight.

When the alumina is alumina doped with magnesium oxide, then the alumina is doped with magnesium oxide in an amount as defined above or an amount of 1 to 40% by weight (i.e. % by weight of the alumina), such as 5 to 28% by weight. More preferably, the alumina is doped with magnesium oxide in amount of 10 to 25% by weight.

Alternatively or additionally, the CM support material or refractory oxide thereof may comprise, or consist essentially of, an alkaline earth metal aluminate. The term "alkaline earth metal aluminate" generally refers to a compound of the formula $MAl_2O_4$ where "M" represents the alkaline earth metal, such as Mg, Ca, Sr or Ba. Such compounds may comprise a spinel structure.

Typically, the alkaline earth metal aluminate is magnesium aluminate ($MgAl_2O_4$), calcium aluminate ($CaAl_2O_4$), strontium aluminate ($SrAl_2O_4$), barium aluminate ($BaAl_2O_4$), or a mixture of two or more thereof. Preferably, the alkaline earth metal aluminate is magnesium aluminate ($MgAl_2O_4$).

In the oxidation catalyst, the catalytic material may comprise a single platinum group metal (PGM), which is platinum (e.g. the catalytic material comprises platinum as the only platinum group metal).

Alternatively, depending on the application of the oxidation catalyst, the catalytic material may comprise (i) platinum (Pt), and (ii) palladium (Pd) and/or rhodium (Rh).

In general, when the catalytic region or the catalytic material thereof comprises Pt and Pd (and optionally Rh), then typically the ratio by mass of Pt to Pd is 1:1. The catalytic material may comprise Pt and optionally Pd, such that the ratio by mass of Pt to Pd is from 1:0 to 1:1. It has been found that volatilisation of platinum occurs when the catalytic material is relatively Pt rich.

It is preferred that when the catalytic material comprises Pt and Pd (and optionally Rh), then the ratio by mass of Pt to Pd is ≥1.5:1, more preferably ≥2:1 (e.g. ≥3:1), even more preferably ≥4:1, such as ≥10:1. The ratio by mass (i.e. mass ratio) of Pt to Pd is preferably 50:1 to 1:1, more preferably 30:1 to 2:1 (e.g. 25:1 to 4:1), even more preferably 20:1 to 5:1, such as 15:1 to 7.5:1.

Generally, when the catalytic material comprises Pt and Rh (and optionally Pd), then typically the ratio by mass of Pt to Rh is 1:1. The catalytic material may comprise Pt and optionally Rh, such that the ratio by mass of Pt to Rh is from 1:0 to 1:1. When the catalytic material comprises Pt and Rh (and optionally Pd), then preferably the ratio by mass of Pt to Rh is ≥1.5:1, more preferably ≥2:1 (e.g. ≥3:1), even more preferably ≤4:1, such as ≥10:1. The ratio by mass (i.e. mass ratio) of Pt to Rh is preferably 50:1 to 1:1, more preferably 30:1 to 2:1 (e.g. 25:1 to 4:1), even more preferably 20:1 to 5:1, such as 15:1 to 7.5:1.

If the catalytic material comprises Pd (and optionally Rh), then the catalytic material may comprise Pd disposed or supported on the CM support material. If Rh is also present, then the catalytic material may comprise Pd and Rh disposed or supported on the CM support material.

Typically, the oxidation catalyst has a total loading of PGM of 5 to 500 g ft$^{-3}$. Preferably, the total loading of PGM is 10 to 400 g ft$^{-3}$, more preferably 20 to 300 g ft$^{-3}$, still more preferably, 25 to 250 g ft$^{-3}$, and even more preferably 30 to 200 g ft$^{-3}$.

When the oxidation catalyst is a diesel oxidation catalyst (DOC), a diesel exotherm catalyst (DEC), a passive NO$_x$ adsorber (PNA), a diesel exotherm catalyst (DEC), a cold start concept (CSC™) catalyst or an ammonia slip catalyst (ASC), then typically the oxidation catalyst or the catalytic material thereof has a total loading of PGM is 20 to 200 g ft$^{-3}$, more preferably 40 to 160 g ft$^{-3}$.

In a second oxidation catalyst embodiment, the oxidation catalyst is a catalysed soot filter (CSF).

When the oxidation catalyst is a catalysed soot filter (CSF), then preferably the oxidation catalyst or the catalytic material thereof has a total loading of PGM is 1 to 100 g ft$^{-3}$, more preferably 5 to 50 g ft$^{-3}$.

When the oxidation catalyst is a diesel oxidation catalyst (DOC), a diesel exotherm catalyst (DEC), a passive NO$_x$ adsorber (PNA), a cold start concept (CSC™) catalyst, an ammonia slip catalyst (ASC) or a catalysed soot filter (CSF), then preferably the oxidation catalyst or the catalytic material thereof does not comprise rhodium (Rh). The catalytic material may comprise platinum (Pt) or platinum (Pt) and palladium (Pd), typically as the only platinum group metals (PGMs).

When the oxidation catalyst is a diesel oxidation catalyst (DOC), diesel exotherm catalyst (DEC) or a catalysed soot filter (CSF), it is preferred that the refractory oxide comprises alumina, such as alumina optionally doped with a dopant (e.g. where the dopant comprises silicon or an oxide thereof, or the dopant is silica) or a mixed or composite oxide of alumina (e.g. silica-alumina). Alternatively, the refractory oxide may consist essentially of alumina.

The catalytic material in the first and second oxidation catalyst embodiments may further comprise a catalyst promoter. The catalyst promoter may comprise, or consist essentially of, an alkaline earth metal. The alkaline earth metal may be selected from the group consisting of magnesium (Mg), calcium (Ca), strontium (Sr), barium (Ba) and a combination of two or more thereof. It is preferred that the alkaline earth metal is calcium (Ca), strontium (Sr), or barium (Ba), more preferably strontium (Sr) or barium (Ba), and most preferably the alkaline earth metal is barium (Ba).

Generally, the catalytic material comprises a total amount of the alkaline earth metal of 10 to 500 g ft$^{-3}$ (e.g. 60 to 400 g ft$^{-3}$ or 10 to 450 g ft$^{-3}$), particularly 20 to 400 g ft$^{-3}$, more particularly 35 to 350 g ft$^{-3}$, such as 50 to 300 g ft$^{-3}$, especially 75 to 250 g ft$^{-3}$.

Typically, the catalyst promoter (e.g. alkaline earth metal) and platinum (and optionally palladium) are supported on the CM support material.

In a third oxidation catalyst embodiment, the oxidation catalyst is a NO$_x$ storage catalyst (NSC).

When the oxidation catalyst is a NO$_x$ storage catalyst (NSC), then preferably the oxidation catalyst or the catalytic material thereof may comprise:
(a) platinum (Pt) and palladium (Pd), preferably Pt and Pd as the only PGMs; or
(b) platinum (Pt) and rhodium (Rh), preferably Pt and Rh as the only PGMs; or
(c) platinum (Pt), palladium (Pd) and rhodium (Rh), preferably Pt, Pd and Rh as the only PGMs.

When the oxidation catalyst is a NO$_x$ storage catalyst (NSC), then preferably the oxidation catalyst or the catalytic material thereof has a total loading of PGM is 20 to 200 g ft$^{-3}$, more preferably 40 to 160 g ft$^{-3}$.

If the catalytic material comprises Pd, then the Pd may be disposed or supported on the CM support material.

If the catalytic material comprises Pd, then the Pd may be disposed or supported on the CM support material.

In the third oxidation catalyst embodiment, it is preferred that the CM support comprises, or consists essentially of, a refractory oxide selected from the group consisting of alumina-magnesium oxide (e.g. a mixed or composite oxide thereof), alumina doped with magnesium oxide and magnesium aluminate (MgAl$_2$O$_4$). More preferably, the refractory oxide is selected from the group consisting of alumina-magnesium oxide (e.g. a mixed or composite oxide thereof) and alumina doped with magnesium oxide. The alumina-magnesium oxide or the alumina doped with magnesium oxide comprise magnesium oxide in an amount of 1 to 40% by weight (i.e. % by weight of the alumina), such as 5 to 28% by weight. More preferably, the alumina is doped with magnesium oxide in amount of 10 to 25% by weight.

When the oxidation catalyst is a NO$_x$ storage catalyst (NSC), then typically the oxidation catalyst or the catalytic material thereof comprises a NO$_x$ storage component.

The NO$_x$ storage component comprises an alkaline earth metal selected from the group consisting of magnesium (Mg), calcium (Ca), strontium (Sr), barium (Ba) and a combination of two or more thereof. It is preferred that the alkaline earth metal is calcium (Ca), strontium (Sr), or barium (Ba), more preferably strontium (Sr) or barium (Ba), and most preferably the alkaline earth metal is barium (Ba).

Typically, the NO$_x$ storage component consists of an oxide, a carbonate or a hydroxide of the alkaline earth metal.

When the oxidation catalyst is a NO$_x$ storage catalyst (NSC), then typically the oxidation catalyst or the catalytic material thereof comprises a total amount of NO$_x$ storage component (e.g. alkaline earth metal) of 250 to 900 g ft$^{-3}$ (e.g. 250 to 500 g ft$^{-3}$), particularly 300 to 850 g ft$^{-3}$ (e.g. 300 to 450 g ft$^{-3}$), more particularly 400 to 800 g ft$^{-3}$, such as 450 to 600 g ft$^{-3}$.

The NO$_x$ storage component may be disposed or supported on the CM support material.

The oxidation catalyst or the catalytic material thereof may further comprise a NO$_x$ storage component support material (referred to herein as "NSC support material"). In addition or as an alternative to disposing or supporting the NO$_x$ storage component on the CM support material, the NO$_x$ storage component may be disposed or supported on the NSC support material.

The NSC support material comprises, or consists essentially of, refractory oxide, such as a refractory oxide selected from the group consisting of ceria and a mixed or composite oxide thereof. The mixed or composite oxide of ceria may be selected from the group consisting of ceria-alumina and ceria-zirconia. It is preferred that the refractory oxide is selected from the group consisting of ceria and ceria-zirconia.

When the NSC support material or the refractory oxide thereof, comprises or consists essentially of ceria-zirconia, then the ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

The oxidation catalyst (including the first to third oxidation catalyst embodiments) or the catalytic material thereof may further comprise a zeolite. It is preferred that the zeolite is a medium pore zeolite (e.g. a zeolite having a maximum ring size of ten tetrahedral atoms) or a large pore zeolite (e.g. a zeolite having a maximum ring size of twelve tetrahedral atoms). Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

Typically, the zeolite has a silica to alumina molar ratio of at least 25:11, preferably at least 25:1, with useful ranges of from 25:1 to 1000:1, 50:1 to 500:1 as well as 25:1 to 100:1, 25:1 to 300:1, from 100:1 to 250:1.

When the oxidation catalyst or catalytic material thereof comprises a zeolite, then typically the total loading of zeolite is 0.05 to 3.00 g in$^{-3}$, particularly 0.10 to 2.00 g more particularly 0.2 to 0.8 g in$^{-3}$.

The capture material is disposed or supported on an outlet end surface of the substrate (e.g. the downstream, end face of the substrate). The outlet end surface of a substrate typically comprises a plurality of channel wall edges.

The outlet end surface of the substrate may be planar (e.g. as in conventional honeycomb substrates) or non-planar. When the outlet end surface of the substrate is non-planar, then the outlet end surface may have a three-dimensional topographical configuration. Examples of substrates having a non-planar end surface are described in U.S. Pat. No. 8,257,659. Substrates having non-planar end surfaces may provide a larger surface area for the capture material to trap volatilised platinum than substrates having planar end surfaces.

In general, it is preferred that the outlet end surface of the substrate is planar.

In addition to being disposed or supported on an outlet end surface of the substrate, the capture material may be disposed or supported on a plurality of channel walls within the substrate. During application of the capture material, some of the capture material may enter the channels of the substrate thereby partially coating the channel walls within the substrate.

When the capture material is disposed or supported on a plurality of channel walls within the substrate, then the oxidation catalyst comprises a capture zone, wherein the capture zone comprises, or consists essentially of, the capture material.

The capture zone typically has a mean length (e.g. from the outlet end surface of the substrate) of ≤25 mm, preferably ≤20 mm, such as ≤15 mm, more preferably ≤10 mm (e.g. ≤5 mm), and even more preferably ≤3 mm (e.g. <3 mm). For the avoidance of doubt, the mean length refers to a length in the axial direction of the substrate.

In general, the oxidation catalyst comprises a catalytic material disposed on the substrate. The catalytic material is disposed or supported on a plurality of channel walls within the substrate.

When the substrate is a filtering monolith substrate, the catalytic material may be disposed or supported on a plugged or sealed end of an inlet channel. It is preferred that the catalytic material is disposed or supported on the plugged or sealed ends of a plurality of inlet channels. Each plugged or sealed end of an inlet channel is at a downstream end (i.e. exhaust gas outlet side) of the substrate.

The catalytic material may be disposed in a region (referred to herein as the "catalytic region"). Thus, the oxidation catalyst may comprise a catalytic region, wherein the catalytic region comprises, or consists essentially of, a catalytic material.

The catalytic region is typically disposed or supported on the substrate. The catalytic region may be disposed directly on to the substrate (i.e. the catalytic region is in contact with a surface of the substrate).

In a first arrangement of the oxidation catalyst of the invention (including the first to third oxidation catalyst embodiment), the catalytic region is a catalytic zone. Preferably, the catalytic zone is disposed or supported at or near an inlet end of the substrate.

Typically, the catalytic zone has a length of 10 to 90% of the length of the substrate (e.g. 50 to 90%), preferably 15 to 80% of the length of the substrate (e.g. 55 to 80%), more preferably 20 to 75% (e.g. 30 to 65%) of the length of the substrate, still more preferably 30 to 65%.

When the oxidation catalyst comprises a capture zone, then the catalytic zone may adjoin the capture zone. Preferably, the catalytic zone is in contact with the capture zone. When the catalytic zone adjoins the capture zone or the catalytic zone is in contact with the capture zone, then the catalytic zone and the capture zone may be disposed or supported on the substrate as a layer (e.g. a single layer). Thus, a layer (e.g. a single) may be formed on the substrate when the catalytic and capture zones adjoin or are in contact with one another. Such an arrangement may avoid problems with back pressure.

The catalytic zone may be separate from the capture zone. There may be a gap (e.g. a space) between the catalytic zone and the capture zone.

The capture zone may overlap the catalytic zone. An end portion or part of the capture zone may be disposed or supported on the catalytic zone. The capture zone generally only partly overlaps the catalytic zone.

In a second oxidation catalyst arrangement of the invention (including the first to third oxidation catalyst embodiment), the catalytic region is a catalytic layer. It is preferred that the catalytic layer extends for substantially an entire length of the substrate, particularly the entire length of the channels of a monolith substrate.

When the oxidation catalyst comprises a capture zone, the capture zone is typically disposed or supported on the catalytic layer. Preferably the capture zone is disposed directly on to the catalytic layer (i.e. the capture zone is in contact with a surface of the catalytic layer).

Substrates for supporting oxidation catalysts are well known in the art. Methods for making washcoats to apply the catalytic material or capture material onto a substrate and methods for applying washcoats onto a substrate are also known in the art (see, for example, our WO 99/47260, WO 2007/077462 and WO 2011/080525).

The substrate typically has a plurality of channels (e.g. for the exhaust gas to flow through). Generally, the substrate is a ceramic material or a metallic material.

It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

Typically, the substrate is a monolith (also referred to herein as a monolith substrate). Such monolith substrates are well-known in the art. The monolith substrate may be a flow-through monolith substrate or a filtering monolith substrate.

A flow-through monolith substrate typically comprises a honeycomb monolith (e.g. a metal or ceramic honeycomb monolith) having a plurality of channels extending therethrough, which channels are open at both ends. When the substrate is a flow-through monolith substrate, then the oxidation catalyst of the invention is typically a diesel oxidation catalyst (DOC), a $NO_x$ storage catalyst (NSC), a passive $NO_x$ adsorber (PNA), a diesel exotherm catalyst (DEC), a cold start concept (CSC™) catalyst or an ammonia slip catalyst (ASC).

A filtering monolith substrate generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure. When the substrate is a filtering monolith substrate, then the oxidation catalyst of the invention is typically a catalysed soot filter (CSF) or a $NO_x$ storage catalyst (NSC) on a filter.

When the monolith substrate is a filtering monolith substrate, it is preferred that the filtering monolith substrate is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

The invention further provides an exhaust system for treating an exhaust gas produced by a compression ignition engine. Typically, the exhaust system comprises (i) an oxidation catalyst of the invention and (ii) an emissions control device.

Examples of an emissions control device include a diesel particulate filter (DPF), a $NO_x$ storage catalyst (NSC), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art.

It is preferred that the exhaust system comprises an emissions control device selected from the group consisting of a $NO_x$ storage catalyst (NSC), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the exhaust system of the invention comprises an SCR catalyst or an SCRF™ catalyst, then the exhaust system may further comprise an injector for injecting a nitrogenous reductant, such as ammonia, or an ammonia precursor, such as urea or ammonium formate, preferably urea, into exhaust gas upstream of the SCR catalyst or the SCRF™ catalyst. Typically, the injector is downstream of the oxidation catalyst. Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas. Ammonia can also be generated by heating ammonium carbamate (a solid) and the ammonia generated can be injected into the exhaust gas.

Alternatively or in addition to the injector, ammonia can be generated in situ (e.g. during rich regeneration of a NSC disposed upstream of the SCR catalyst or the SCRF™ catalyst). Thus, the exhaust system may further comprise an engine management means for enriching the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the exhaust system of the invention, preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first exhaust system embodiment, the exhaust system comprises the oxidation catalyst of the invention (e.g. as a DOC, a DEC, a NSC, a PNA, a CSC™ catalyst or an ASC) and a selective catalytic reduction filter (SCRF™) catalyst. The oxidation catalyst of the invention is typically followed by (e.g. is upstream of) the selective catalytic reduction filter (SCRF™) catalyst. A nitrogenous reductant injector may be arranged between the oxidation catalyst and the selective catalytic reduction filter (SCRF™) catalyst. Thus, the oxidation catalyst may be followed by (e.g. is upstream of) a nitrogenous reductant injector, and the nitrogenous reductant injector may be followed by (e.g. is upstream of) the selective catalytic reduction filter (SCRF™) catalyst.

In a second exhaust system embodiment, the exhaust system comprises the oxidation catalyst of the invention (e.g. as a CSF, DOC, a DEC, a NSC, a PNA, a CSC™ catalyst or an ASC) and a selective catalytic reduction (SCR) catalyst and optionally either a catalysed soot filter (CSF) or a diesel particulate filter (DPF).

In the second exhaust system embodiment, the oxidation catalyst of the invention is typically followed by (e.g. is upstream of) the selective catalytic reduction (SCR) catalyst.

A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst may be followed by (e.g. are upstream of) the catalysed soot filter (CSF) or the diesel particulate filter (DPF).

A third exhaust system embodiment relates to an exhaust system comprising a diesel oxidation catalyst (DOC), the oxidation catalyst of the invention, preferably as a catalysed soot filter (CSF), and a selective catalytic reduction (SCR) catalyst. The diesel oxidation catalyst (DOC) is typically followed by (e.g. is upstream of) the oxidation catalyst of the invention. The oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst.

In any of the exhaust system embodiments described hereinabove, an ASC catalyst can be disposed downstream from the SCR catalyst or the SCRF™ catalyst (i.e. as a separate substrate monolith), or more preferably as a zone on a downstream or trailing end of the substrate monolith comprising the SCR catalyst can be used as a support for the ASC.

The invention further provides a vehicle. The vehicle comprises a compression ignition engine and either an oxidation catalyst or an exhaust system of the invention. The compression ignition engine is preferably a diesel engine. The diesel engine may be a homogeneous charge compression ignition (HCCI) engine, a pre-mixed charge compression ignition (PCCI) engine or a low temperature combustion (LTC) engine. It is preferred that the diesel engine is a conventional (i.e. traditional) diesel engine.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

Definitions

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The expression "coinage metal" as used herein refers to the metals copper (Cu), silver (Ag) and gold (Au).

The expression "end surface" as used herein, particularly with reference to an "inlet end surface" or an "outlet end surface", is synonymous with the expression "end face". The end surface or end face of a substrate is typically formed by the wall edges (e.g. at an exterior surface of the substrate) that define or bound the channels through the substrate.

The expression "Pt-alloying material" as used herein refers to a material capable of forming an alloy with platinum (i.e. platinum metal), preferably when the temperature of the exhaust gas is <900° C., particularly <800° C., such as <700° C.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a washcoat region, a washcoat layer or a washcoat zone, means that the material in a minor amount, such as ≤5% by weight, preferably ≤2% by weight, more preferably ≤1% by weight. The expression "substantially free of" embraces the expression "does not comprise".

The expression "about" as used herein with reference to an end point of a numerical range includes the exact end point of the specified numerical range. Thus, for example, an expression defining a parameter as being up to "about 0.2" includes the parameter being up to and including 0.2.

The term "selective catalytic reduction filter catalyst" as used herein includes a selective catalytic reduction formulation that has been coated onto a diesel particulate filter (SCR-DPF), which is known in the art.

EXAMPLES

The invention will now be illustrated by the following non-limiting examples.

Example 1

Preparation of Substrate Coated with 3 wt % Cu/CHA Zeolite

Commercially available aluminosilicate CHA zeolite was added to an aqueous solution of $Cu(NO_3)_2$ with stirring. The slurry was filtered, then washed and dried. The procedure can be repeated to achieve a desired metal loading. The final product was calcined. After mixing, binders and rheology modifiers were added to form a washcoat composition.

A 400 cpsi cordierite flow-through substrate monolith was coated with an aqueous slurry of the 3 wt % Cu/CHA zeolite sample using the method disclosed in WO 99/47260. This coated product (coated from one end only) is dried and then calcined and this process is repeated from the other end so that substantially the entire substrate monolith is coated, with a minor overlap in the axial direction at the join between the two coatings. The coated substrate monolith was aged in a furnace in air at 500° C. for 5 hours. A core of 1 inch (2.54 cm) diameter×3 inches long (7.62 cm) was cut from the finished article.

Example 2

Silica-alumina powder was slurried in water and milled to a $d_{90}$<20 micron. Barium acetate was added to the slurry followed by appropriate amounts of soluble platinum and palladium salts. Beta zeolite was added and the slurry stirred to homogenise. The resulting washcoat was applied to the inlet channels of a cordierite flow through monolith having 400 cpsi using conventional coating techniques. The part was then dried.

A second slurry of silica-alumina was milled to a $d_{90}$<20 micron. Soluble platinum salt was added and the mixture was stirred to homogenise. The slurry was applied to the outlet end of the substrate using established coating techniques. The part was then dried and calcined at 500° C.

The resulting catalyst had a total PGM loading of 150 g $ft^{-3}$ and a Pt:Pd weight ratio of 3:1.

Example 3

A catalyst was prepared according to Example 2. A further solution of Pd nitrate was impregnated onto the outlet face of the catalyst using an adsorbent polymer foam material that was saturated with the solution to achieve a coating depth of 5 mm. The amount of additional Pd applied to the outlet face of the catalyst was 0.29 g. This is equivalent to a loading of 101.6 g $ft^{-3}$ in the 5 mm zone. The catalyst was dried and calcined at 500° C.

Experimental Results

System Tests

Tests were performed on a first synthetic catalytic activity test (SCAT) laboratory reactor illustrated in FIG. 1, in which an aged core of the coated Cu/CHA zeolite SCR catalyst of Example 1 was disposed in a conduit downstream of a catalyst core of Example 2 or Example 3. A synthetic gas mixture was passed through the conduit at a rate of 6 liters per minute. A furnace was used to heat (or "age") the oxidation catalyst samples at steady-state temperature at a catalyst outlet temperature of 900° C. for 2 hours. The SCR catalyst was disposed downstream of the oxidation catalyst sample and was held at a catalyst temperature of 300° C. during the ageing process by adjusting the length of tube between the furnace outlet and the SCR inlet, although a water cooled heat exchanger jacket could be used as appropriate. Temperatures were determined using appropriately positioned thermocouples ($T_1$ and $T_2$). The gas mixture used during the ageing was 40% air, 50% $N_2$, 10% $H_2O$.

Following the ageing of the oxidation catalysts, the SCR catalysts were removed from the first SCAT reactor and inserted into a second SCAT reactor specifically to test the $NH_3$—SCR activity of the aged samples. The SCR catalysts were then tested for SCR activity ($NO_x$ conversion) at 500° C. using a synthetic gas mixture ($O_2$=10%; $H_2O$=5%, $CO_2$=330 ppm; $NH_3$=400 ppm; NO=500 ppm; $NO_2$=0 ppm; $N_2$=balance, i.e. an alpha value of 0.8 was used (ratio of $NH_3$:$NO_x$), so that the maximum possible $NO_x$ conversion available was 80%) and the resulting $NO_x$ conversion is shown in Table 1.

TABLE 1

| Example No. (aged upstream oxidation catalyst) | $NO_x$ conversion (%) |
| --- | --- |
| blank | 59 |
| 2 | 9 |
| 3 | 50 |

Table 1 shows the $NO_x$ conversion activity of aged SCR catalyst cores taken from Example 1 after ageing with upstream oxidation catalyst cores at 900° C. for 2 hours. The "blank" sample is a reference sample where no platinum containing oxidation catalyst was placed upstream of the SCR core in the ageing apparatus. That is, the blank ageing was carried out in the absence of a platinum containing catalyst and hence platinum volatilisation could not occur. The $NO_x$ conversion at 500° C. was 59% and represents the baseline conversion that is achieved after ageing without platinum volatilisation.

The SCR sample that was aged with a core from Example 2 in the upstream location shows a significant reduction in $NO_x$ conversion. The catalyst of Example 2 has no platinum capture material and the decrease in NOx performance of the SCR sample is attributed to Pt volatilisation. The SCR sample that was aged with a core from Example 3 in the upstream location shows a minor decrease in $NO_x$ conversion performance compared with the blank run. Example 3 made according to the invention comprises a capture material applied to 5 mm of the outlet end of the catalyst. Example 3 is effective for capturing volatile Pt.

For the avoidance of any doubt, the entire content of any and all documents cited herein is incorporated by reference into the present application.

The invention claimed is:

1. An oxidation catalyst for treating an exhaust gas produced by a compression ignition engine comprising:
   a substrate having an inlet end surface and an outlet end surface;
   a catalytic material disposed on the substrate, wherein the catalytic material comprises platinum (Pt); and
   a capture zone comprising a capture material,
   wherein the capture material is disposed on the outlet end surface of the substrate and a plurality of channel walls within the substrate, wherein the capture zone has a mean length of ≤15 mm; and
   wherein the capture material comprises a Pt-alloying material, wherein the Pt-alloying material comprises a metal or an oxide thereof selected from the group consisting of palladium (Pd); gold (Au); copper (Cu); a mixture of Pd and Au; a mixture of Pd and Cu; a mixture of Au and Cu; a mixture of Pd, Au and Cu; a bimetallic alloy of Pd and Au; a bimetallic alloy of Pd and Cu; a bimetallic alloy of Au and Cu; and a trimetallic alloy of Pd, Au and Cu.

2. An oxidation catalyst according to claim 1, wherein the capture zone has a mean length of ≤10 mm.

3. An oxidation catalyst according to claim 1, wherein the metal is selected from the group consisting of palladium (Pd), a mixture of Pd and Au, and a bimetallic alloy of Pd and Au.

4. An oxidation catalyst according to claim 1, wherein the capture material comprises a refractory oxide.

5. An oxidation catalyst according to claim 4, wherein the refractory oxide is selected from the group consisting of alumina, silica, titania, zirconia, ceria and a mixed or composite oxide thereof, wherein the mixed or composite oxide is selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

6. An oxidation catalyst according to claim 1, wherein the catalytic material comprises platinum (Pt) disposed or supported on a support material.

7. An oxidation catalyst according to claim 1, wherein the catalytic material comprises:
   (i) platinum (Pt), and
   (ii) at least one of palladium (Pd) and rhodium (Rh).

8. An oxidation catalyst according to claim 1, wherein the catalytic material comprises Pt and Pd in a ratio by mass of Pt to Pd of >1:1.

9. An oxidation catalyst according to claim 1, wherein the catalytic material comprises Pt and Rh in ratio by mass of Pt to Rh of >1:1.

10. An oxidation catalyst according to claim 1, wherein the substrate is a flow-through monolith substrate.

11. An oxidation catalyst according to claim 1, wherein the substrate is a filtering monolith substrate.

12. An oxidation catalyst according to claim 1, which is a diesel oxidation catalyst (DOC), a catalysed soot filter (CSF), a NOx storage catalyst (NSC), a passive NOx adsorber (PNA), a diesel exotherm catalyst (DEC), a cold start concept catalyst or an ammonia slip catalyst (ASC).

13. An exhaust system for treating an exhaust gas produced by a compression ignition engine, wherein the exhaust system comprises an oxidation catalyst according to claim 1, and an emissions control device.

14. An exhaust system according to claim 13, wherein the emissions control device is a selective catalytic reduction (SCR) catalyst or a selective catalytic reduction filter catalyst.

15. A vehicle comprising a compression ignition engine and an exhaust system according to claim 13.

* * * * *